United States Patent
Bhattacharya

(10) Patent No.: US 7,208,537 B2
(45) Date of Patent: Apr. 24, 2007

(54) SELF-PRIMING CHROMATE FREE CORROSION RESISTANT COATING COMPOSITION AND METHOD

(75) Inventor: Dhrubo Bhattacharya, New Delhi (IN)

(73) Assignee: Rotomac Electricals PVT, Ltd., Calcutta (IN)

( * ) Notice: Subject to any disclaimer, the term of this patent is extended or adjusted under 35 U.S.C. 154(b) by 166 days.

(21) Appl. No.: 10/512,494

(22) PCT Filed: Apr. 30, 2002

(86) PCT No.: PCT/IB02/01509

§ 371 (c)(1), (2), (4) Date: Oct. 26, 2004

(87) PCT Pub. No.: WO03/093380

PCT Pub. Date: Nov. 13, 2003

(65) Prior Publication Data
US 2006/0063881 A1 Mar. 23, 2006

(51) Int. Cl.
*C08G 18/68* (2006.01)
(52) U.S. Cl. ............... 524/356; 524/557; 524/247; 524/502
(58) Field of Classification Search ........ 524/356, 524/557, 247, 502
See application file for complete search history.

(56) References Cited

U.S. PATENT DOCUMENTS

| | | | |
|---|---|---|---|
| 2,279,439 A | 1/1942 | Bowlby et al. | 260/9 |
| 4,098,749 A * | 7/1978 | Hoshino et al. | 524/114 |
| 5,077,332 A | 12/1991 | Blattler et al. | 524/389 |
| 5,130,361 A | 7/1992 | Hegedus et al. | 524/204 |
| 5,202,367 A | 4/1993 | Hegedus et al. | 524/204 |
| 5,236,983 A | 8/1993 | Hegedus et al. | 524/204 |
| 5,274,021 A | 12/1993 | Geeck et al. | 524/417 |
| 5,403,880 A | 4/1995 | Hegedus et al. | 524/24 |
| 5,427,821 A | 6/1995 | Hegedus et al. | 427/385.5 |
| 5,491,185 A | 2/1996 | Hegedus et al. | 523/451 |
| 5,539,032 A | 7/1996 | Hegedus et al. | 524/204 |

FOREIGN PATENT DOCUMENTS

| | | |
|---|---|---|
| GB | 588425 | 5/1947 |
| GB | 766627 | 1/1957 |
| GB | 782 393 | 9/1957 |

OTHER PUBLICATIONS

XP-002225938—"Insulate Cable Coating Mixture Phenoxy Resin Polyvinyl Formaldehyde Resin Cresol, Formal Dehyde Initial Condensate" (Tokyo Shibaura Electric Co )—JP49041627.

* cited by examiner

*Primary Examiner*—Robert D. Harlan
(74) *Attorney, Agent, or Firm*—Bachman & LaPointe

(57) ABSTRACT

A self-priming rapid curing chromate free corrosion resistant coating composition based on a random polyvinyl terpolymer and an alkyd resin with a hydroxyl number between 80–200 in association with a mineral acid catalyst, at least one organic solvent and a drying agent wherein the vinyl terpolymer is predominantly a polyvinyl formal with polyvinyl alcohol and polyvinyl acetate as the other two copolymers, the terpolymer cross linking through its hydroxyl groups with the alkyd resin in the composition during curing. The composition can be applied as a clear coat or as a pigmented composition with addition of pigments on ferrous and non-ferrous metallic substrate and is suitable for continuous coil coating lines. A method of coating a ferrous and non-ferrous metallic substrate by applying a coating composition on its surface and coated articles so produced.

35 Claims, No Drawings

SELF-PRIMING CHROMATE FREE CORROSION RESISTANT COATING COMPOSITION AND METHOD

FIELD OF THE INVENTION

This invention relates to a self-priming coating composition based on a polymeric material, particularly a vinyl terpolymer of polyvinyl formal, polyvinyl alcohol and polyvinyl acetate with an alkyd co-resin. This coating composition can be applied on ferrous or non-ferrous metallic substrates. The rapid curing nature coupled with high flexibility and resistance to wear, abrasion, corrosion and thermal shocks makes it most ideal for continuous coil coating lines. This can be formulated both as a clear coat as well as a pigmented coating in a range of colours in a blend of volatile organic solvents. It is self-priming in nature and can be applied as a top coat directly on the metal surface without any primer thereby making the coating method most cost effective. The absence of any primer helps to avoid toxic materials, especially chromate salts normally accompanying a primer and thereby makes the coating environment friendly.

BACKGROUND OF THE INVENTION

Pre-coated metals generated in continuous coil coating lines processing rolled stock such as cold rolled steel, hot dip galvanized steel, stainless steel, tin plated steel and aluminum, represent a major industrial activity today. Steel, excluding hot rolled steel, is increasingly being coated in this manner. The organic products normally employed for this purpose are based on silicones, polyesters, epoxies, urethanes, acrylics and combinations thereof, PVC plastisols and fluorocarbons. Most of these products are solvent based i.e. contain a volatile organic solvent, though some are also available as powdered resin to be applied as powder coatings. Invariably these products require their specific primers as these lack the ability to adhere directly to substrates in the short oven dwell times of continuous coil coating lines.

Self-priming coating formulations have been generally made based on alkyds (U.S. Pat. No. 5,539,032) polyurethanes (U.S. Pat. Nos. 5,427,821, 5,403,880 and 5,236,983), epoxies (U.S. Pat. Nos. 5,491,185, 5,202,367 and 5,130,361), phenoxy (U.S. Pat. No. 5,274,021) and other resins and combinations thereof. The aforementioned formulations, however, are meant for structural applications with long curing cycles where they replace conventional primer plus top coats. Such compositions are not suited to the intricate and rigorous demands of the continuous coil coating lines, where coatings ought to harden/cure on the substrate in less than a minute and should be extremely flexible and scratch resistant so as to withstand post forming rigors in engineering, appliance and construction industries. In addition to these properties the coatings should be chemically resistant and possess good weatherability and aesthetic appeal to function as a top coat.

The products used for metal pre-coating in continuous coil coating lines ranging from vinyl plastisols and fluorocarbons to thermosetting resins as stated in prior art have a limitation in that these do not generally offer a combination of high scratch hardness with good flexibility. Hardness of the thermosetting resinous coating depends on the density of cross links of these resins on cure. As this density increases, the material hardens but begins to lose its flexibility. Contrarily, a coating that is inherently flexible such as plastisol, has a low Glass Transition Temperature ($T_g$) and hardness. Further, these coatings are also poor in thermal resistance. Therefore such coatings are unsuitable as abrasion resistant coatings and in applications requiring high heat resistance. On the other hand, coatings with high surface hardness normally contain large amounts of inorganic pigments and additives, mainly zinc and its compounds. Coatings rich in inorganic content generally demonstrate poor flexibility restricting their use in applications requiring the ability of coated substrates to withstand forming, drawing and other related operations.

Another general limitation indicated in prior art is the requirement of selective primers for the presently used coatings. The primers ordinarily contain a large percentage of inorganic additives and corrosion inhibiting pigments. Such additives in some cases include chromate based compounds which are considered to be toxic and harmful. These primers are normally used to provide an anchor for the top coat. Priming of metal substrate is expensive and time consuming, as this adds another operation to the coating scheme besides increasing the cost of removal of the paint during stripping operation. It also adds to the overall thickness of the coating, which may be undesirable in certain applications.

Self-priming products offer very high corrosion resistance if they have good barrier characteristics. A high dielectric strength/volume resistivity is vital for withstanding electrochemical corrosion on a variety of substrates more so on ferrous surfaces. Adhesion to the substrate following the extremely rapid curing process adopted by continuous coil coating lines is essential.

Self-priming coatings so far proposed for metallic structures as disclosed in the U.S. Patents referred to above have long cure cycles. No satisfactory self-priming coating system is available at present for ferrous/non-ferrous substrate that is amenable to continuous coil coating applications and possesses the combination of high surface hardness and good flexibility with corrosion resistance and weatherability.

Accordingly, there was a long felt need to provide a coating composition, which ensures hardness with flexibility in a thin self-priming coat. The inventor of the instant invention has found that the combination of a vinyl terpolymer with an alkyd resin which cross links through hydroxyl groups exhibits a synergistic effect to produce the much desired coating having good flexibility with high surface hardness while ensuring quick curing for continuous coil coating application at the same time. It will be obvious to someone skilled in the art that such properties offer important advantages in a variety of applications.

OBJECTS OF THE INVENTION

The first object of the invention is to provide a quick drying, tightly adhering, self-priming polymer coating with notable dielectric, barrier and thermal characteristics.

The second object of the invention is to provide a self-priming polymer coating composition with quick curing time to make it suitable for continuous coil coating lines.

The third object of the invention is to provide a polymer coating which has high degree of flexibility and surface hardness at the same time.

The fourth object of the invention is to provide an environment friendly chromate free corrosion resistant coating composition.

Another object of the invention is to provide a coating method for coating a ferrous or non-ferrous metallic substrate by using a primer free corrosion resistant coating composition.

Yet another object of the invention is to apply the coating composition of the invention as an under coat followed by one or more top coat(s) of resins.

Yet another object of the invention is to provide coated articles at least one surface of which is coated by applying the coating composition according to the invention.

SUMMARY OF THE INVENTION

Accordingly the present invention provides a self-priming rapid curing, chromate free, corrosion resistant coating composition comprising:
a) a linear vinyl terpolymer made up pre-dominantly of polyvinyl formal with polyvinyl alcohol and polyvinyl acetate as the two other co-polymers having three randomly distributed functional groups comprising acetyl, formal and hydroxyl groups along the vinyl backbone that offers cross-linking sites through the hydroxyl groups during curing;
b) an alkyd resin with hydroxyl number ranging from 80–200 measured as mg. potassium hydroxide per gram of the resin;
c) a mineral acid catalyst;
d) one or more organic solvent(s);
e) a drying agent and optionally
f) one or more chromate free inorganic pigment and/or organic dyes.

The said coating composition may be suitably pigmented with inorganic pigments and/or organic dyes to obtain pigmented coatings in a choice of attractive colours with low to medium gloss.

The invention also provides a method of coating ferrous or non-ferrous metal substrates by applying the composition according to invention on the surface of the said substrate in desired thickness and curing the same.

The invention further provides a coated article comprising a ferrous or a non-ferrous metallic substrate of which at least one surface is coated with the coating composition according to the invention.

DETAILED DESCRIPTION OF THE INVENTION

A linear vinyl terpolymer, namely polyvinyl formal, polyvinyl alcohol and polyvinyl acetate with three functional groups randomly distributed along the vinyl backbone offers cross linking sites through the hydroxyl groups. The density of cross links may be controlled by the numbers and placement of hydroxyl group, in the vinyl backbone of the polymer. This polymer possess a rare combination of mechanical, thermal, chemical and dielectric properties. The functional groups along with its vinyl backbone confer to this polymer the properties of adhesion, toughness, chemical inertness and heat stability while the long linear chains contributes to the outstanding flexibility. The spatial structure of this thermoplastic material helps to form a closely packed molecular structure which in turn provides excellent barrier characteristics when coated on a wide array of substrates. The hydroxyl groups are fully accessible for cross linking and this makes the thermoplastic polymer heat curable in the presence of a mineral acid. The chain length distribution of a poly disperse polymer is made such as to permit film formation, migration by diffusion to the substrate and development of the required cohesive strength in the coating. Specifically, the terpolymer used in the invention has weight average molecular weight ranging between 20,000 and 120,000, preferably between 25,000 and 70,000.

The content of polyvinyl alcohol, polyvinyl acetate and polyvinyl formal of the vinyl terpolymer used for the invention is 6.0–15%, 9.0–15% and 70–84% respectively by weight and preferably 6.0–7.5%, 10–13% and 80–83% respectively by weight.

The said terpolymer useable in the composition may be produced by simultaneous hydrolysis and formalization of polyvinyl acetate in acetic acid media. For this purpose polyvinyl acetate of the required molecular weight (28,000–170,000) and of low to very low branching frequency is dissolved in acetic acid and formalin (37% formaldehyde aqueous solution) at room temperature. Dilute sulfuric acid (N/10 normalty) is added to this solution with agitation. The contents are well stirred, heated to 75° C. and maintained at this condition for 20–24 hours. The whole process is conducted in a homogenous solution state. By regulating quantities of acetic acid, water and formaldehyde, the required composition of the functional groups of the vinyl backbone viz. acetyl, hydroxyl and formal may be obtained. Typically for one part of polyvinyl acetate, 1.65 parts of acetic acid, 0.55 parts of water and 0.45 part of formalin (37% formaldehyde solution in water) is used to obtain a composition comprising 6.0–6.5% polyvinyl alcohol, 11.0–12.0% polyvinyl acetate and 81.5–83.0% polyvinyl formal. The extent of reaction is determined by the percentage of hydroxyl and acetyl groups in the extracted polymer and the reaction is terminated at the desired point by neutralizing the acid catalyst with a dilute alkali. The polymer is next precipitated from solution by adding water as non-solvent, washed and dried. The simultaneous hydroxyl and formalisation reactions prevent the development of blocky sequences on vinyl chain in a homogenous media and thus helps to get a random terpolymer. The $T_g$ of the terpolymer so produced ranges between 100–115° C.

The alkyd resin used in the combination acts as a tackifier and promotes adhesion at low temperature of application. On curing at elevated temperature the alkyd resin cross links with the vinyl polymer through hydroxyl groups which helps to improve the chemical inertness, thermal and corrosion resistance as well as gloss of the coating. The alkyd resin used for the invention is a medium oil resin of hydroxyl number ranging from 80–200 and preferably in the range of 120–140. The lightly cross linked vinyl alkyd matrix has excellent flexibility, scratch resistance and barrier characteristics.

The alkyd resin may be derived from carboxylic polybasic acids including aliphatic saturated dibasic acids like adipic, succinic, sebacic and anthdrides thereof; aliphatic unsaturated dibasic acids like maleic, fumaric and anhydrides thereof; and aromatic polybasicacids such as phthalic, isophthalic, terephthalic and anhydrides thereof. These acids may be used alone or in combination. The polyhydric alcohol used to prepare alkyd resins may be selected from the group comprising of ethylene glycol, diethylene glycol, triethylene glycol, propylene glycol, neopentyl glycol, cyclohexene dimethanol, glycerol and pentaeritol. These alcohols may be used alone or in combination.

Modified fatty acids derived from drying to nondrying oils such as linseed oil, dehydrated castor oil, tung oil and coconut oil may be used either alone or in combination in the preparation of alkyd resins. Xylene is normally used as the azeotropic solvent for water removal during processing and also to solubilize the alkyd solids. The alkyd drier useful for the invention may be selected from various metal octoates and/or naphthenates. The alkyd resin used in this invention was produced from linseed oil, glycerin, pentaerythritol, isophthic acid and terephthalic acid with manganese nuxtra, cobalt naphthanate and zinc octoate as driers in xylene solvent. The solids percentage of this alkyd resin ranged from 60–75%. Its hydroxyl number ranged from 120–140.

The liquid coating may be formulated using 0.8–1.5 parts of the vinyl polymer with 1 part of alkyd resin (100% solids basis) and 1–10% by weight of phosphoric acid based on the weight of the polymer. The polymer and resin may be dissolved in a blend of organic solvents including aromatics such as toluene, xylene and naphtha and alcohols such as ethanol, butanol and isopropanol with a major proportion of ethylene dichloride. Solvents such as methyl ethyl ketone (MEK), methyl isobutyl ketone (MIBK), cellosolve, cellosolve acetate and diacetone alcohol may also be used to form solvent blends. A ternary blend of solvents is recommended for quick drying. The level of solids is maintained from 20–40% by weight to suit the viscosity requirements during roller coating operations on coil coating lines. Solvent-free dry formulations are also possible in a hot melt dispenser especially for thick coatings. Such solvent-free formulations can be prepared by using plasticizer such as phthalates and flow improvers such as rosin and its derivatives. The clear coat so formed shows good spreading characteristics and adhesion on all the substrates referred to earlier. High cohesive strength is obtained in short curing cycles at elevated temperatures typically used in continuous metal pre-coat lines. It has strong barrier characteristics and it passivates the metal substrates coated to restrict corrosion. The coated panels of galvanized steel, cold rolled steel and aluminum exhibit good corrosion resistance when exposed to salt spray environment and adequate resistance to blistering or loss of adhesion. Most importantly the coating exhibits extreme flexibility in thin hard layers and demonstrates a scratch hardness of at least 5 H. Further, this coating shows no deterioration of adhesion and its integrity when exposed to temperatures ranging from −50° C. to 180° C. for sustained periods.

This heat curable clear coat system may be pigmented to impart colour in low to medium gloss to coated substrates. Titanium dioxide may be added for opacity and coloured inorganic pigments and/or organic dyes may be used for colour. The pigment binding power of the polymer-resin system is quite high however, low to moderate levels of such addition is suggested for optimum corrosion resistance. This ensures that the passivating nature of the cured film and its barrier characteristics are maintained with high flexibility. Blister resistance is obtained even with a low porosity of the film due to the passivation achieved on the metal interface. A range of corrosion inhibiting pigments may be selected comprising of inorganic and organic pigments which offer passive inhibition, for example, zinc molybdate and other molybdates, zinc phosphate, mica, tolyltriazole, complex organotitanate and other organic inhibitors which operate by passive inhibition. The incorporation of corrosion inhibiting pigments improves further the corrosion resistance of the coating. The pigments can be incorporated in the coating by first forming a mill base by conventional sand grinding or ball milling techniques, a concentrated solution of the polymer and resin of concentration 30–60% in the organic solvent blend, together with the pigments, and then blended with the remaining portion of solvents by high speed stirring or agitation. This coating, with or without pigments, dries by solvent evaporation on substrate such as cold rolled steel, hot dip galvanized steel and aluminum when sprayed or flow coated on these surfaces. The rate of evaporation of the solvents especially at the cure temperatures used in metal pre-coat lines with peak metal temperatures ranging from 180–280° C. may be adjusted by the choice of the solvents from the ones enumerated earlier. Specifically, a blend of xylene and butanol in a 70:30 weight ratio and ethylene dichloride was used for this invention. The ethylene dichloride content is generally kept higher in these blends and typically ranges from 1.0–2.5 parts per part of the aromatic-alcohol blend by weight.

The coating composition of the instant invention may be applied to ferrous and non-ferrous substrate including cold-rolled steel, hot dip galvanized steel, stainless steel, tin plated steel, aluminum and other non-ferrous substrate in thin films of dry film thickness (DFT) ranging from 5–30 micrometers preferably 10–25 micrometers. This self-priming composition is particularly suited to metal pre-coating process in coil coating lines because of its quick curing nature in the temperature-time profile used in these applications. It can be formulated as free flowing one pack liquid which can be stored below 25° C. for 6 (six) months or as a two pack system with the catalyst as a separate component to be mixed prior to application.

The coating composition of the instant invention provides good corrosion protection to ferrous or non-ferrous substrates even without any pre-treatment of the metal surface in many cases except degreasing, thereby eliminating an expensive, environmentally damaging pre-treatment procedure.

The curing time for the composition of the invention is less than 60 seconds or less than 30 seconds depending on the substrate, coating thickness and temperature.

Apart from its application as a top coat, the coating composition of the instant invention may also be used as an undercoat which may be followed by top coats of resins selected from the group consisting of epoxy, urethane, alkyd, amino and polyesters.

The following examples of compositions are illustrative of the invention and are not intended to limit the scope of the invention as defined by the appended claims.

The polyvinyl terpolymer as used in these examples are prepared by the process as described earlier with the weight content of polyvinyl alcohol, polyvinyl acetate and polyvinyl formal at 6.0–7.5%, 10–13% and 80–83% respectively.

EXAMPLE 1

Clear Coat

A clear coat composition may be prepared from the following ingredients in the assigned weight percentages:

| Ingredients | Range of weight % |
| --- | --- |
| Polyvinyl Terpolymer | 10–22 |
| Alkyd Resin (100% solids basis) | 9–15 |
| Ortho Phosphoric Acid (88–93%) | 0.1–2.2 |
| Xylene | 7–25 |
| Butanol | 3–15 |
| Ethylene Dichloride | 25–55 |
| Manganese Nuxtra | 0–0.2 |
| Zinc Octoate | 0–0.2 |
| Cobalt Naphthanate | 0–0.2 |

A specific clear coat composition was prepared by incorporating the ingredients taken in the following weight percentages for testing:

| Ingredients | Weight % |
| --- | --- |
| Polyvinyl Terpolymer | 14.3 |
| Alkyd Resin (100% solids basis) | 11.7 |
| Ortho Phosphoric Acid (88–93%) | 0.7 |
| Xylene | 16.5 |
| Butanol | 7.1 |
| Ethylene Dichloride | 49.5 |
| Manganese Nuxtra | 0.05 |
| Zinc Octoate | 0.05 |
| Cobalt Naphthanate | 0.1 |

The clear coat is prepared by dissolving the vinyl polymer and the alkyd resin in a mix of xylene—butanol (70:30 pts by wt.) and ethylene dichloride. The drier and the catalyst are then added to this solution. The panels used were degreased prior to application. However, no other pretreatment was done e.g. acid oxidation for aluminum. The composition was applied and cured on aluminum, CR steel and galvanized steel panel in thickness ranging from 20–25 micrometers. The coatings exhibited good weatherability, resistance to water immersion, humidity and heat when exposed to 180° C. for a sustained period of 24 hours or more. The flexibility was excellent (OT) and the scratch hardness was 5 H or higher. On exposure to salt spray the scribed panel showed no detorioration through blistering, loss of adhesion or corrosion for 500 hours in case of CR steel panels and galvanized panels and 1000 hours for aluminum. The galvanized panel in addition showed no white rust formation after 500 hours of exposure. The solvent resistance to MEK (Methyl Ethyl Ketone) was good with the material passing 100 rubs.

EXAMPLE 2

Pigmented Coating

A pigmented coating composition according to the present invention can be prepared from the listed ingredients taken in the following weight percentages:

| Ingredients | Range of weight % |
| --- | --- |
| Polyvinyl Terpolymer | 10–20 |
| Alkyd Resin (100% solids basis) | 8–15 |
| Ortho Phosphoric Acid (88–93%) | 0.1–2.0 |
| Xylene | 7–25 |
| Butanol | 3–15 |
| Ethylene Dichloride | 25–55 |
| Titanium Dioxide | 5–15 |
| Manganese Nuxtra | 0–0.2 |
| Zinc Octoate | 0–0.2 |
| Cobalt Naphthanate | 0–0.2 |

A specific pigmented off-white coating composition was prepared from the listed ingredients in the following weight percentages for testing:

| Ingredients | Weight % |
| --- | --- |
| Polyvinyl Terpolymer | 12.3 |
| Alkyd Resin (100% solids basis) | 10.1 |
| Orthophosphoric Acid (88–93%) | 0.6 |
| Xylene | 16.0 |
| Butanol | 6.6 |
| Ethylene Dichloride | 47.0 |
| Titanium Dioxide | 7.2 |
| Manganese Nuxtra | 0.05 |
| Zinc Octoate | 0.05 |
| Cobalt Naphthanate | 0.1 |

The vinyl polymer and alkyd resin are dissolved in a mix of xylene and butanol (70:30 pts. by wt.) and ethylene dichloride to obtain a concentrated solution of about 40% by weight. This solution is then milled with the pigments, drier and catalyst for six hours and finally mixed under agitation with the balance solvents to obtain the desired viscosity and solids level.

The off-white coating was applied on substrates as in earlier example. The thickness ranged from 20–25 micrometers. These panels showed good weatherability, resistance to water immersion and humidity. Further, there was no deterioration in properties on prolonged exposure of 24 hours or more at 200° C. Flexibility obtained was excellent (OT) and scratch hardness was found to be at least 6 H. The salt spray exposure and MEK resistance showed the same behaviour as reported above for Example 1. Here again no pre-treatment of the substrate was done other than degreasing. Other colours can be incorporated by adding coloured inorganic pigments/organic dyes which offer corrosion protection by passivation and titanium dioxide if necessary, in doses of 0–15% by weight of the total formulation in solvent bearing compositions.

The non-volatile components of the coating composition of this invention including the polymer, resin and pigments can range from 20–100% and is typically between 30–40% by weight of the total composition.

TESTING METHOD

The numbers of tests carried out on each of the substrate were 10 and the average value has been quoted in above examples. The testing method that was applied for different physiochemical characteristics are given below:
  (i) Scratch hardness—A pencil hardness index was used as is common in the industry.
  (ii) Corrosion resistance—Salt spray exposure as per ASTM B-117 and MEK resistance using solvent rub test as is common in the industry.
  (iii) Adhesion—ASTM D02197/3359. The performance is indicated merely as a pass or fail.
  (iv) Dielectric property—Volume resistivity as per ASTM D-257. Value obtained=$7 \times 10^{15}$ $\Omega$Cm.
  (v) Flexibility—As per ASTM D-552. Instead of choosing a mandrel the coated substrate was folded on itself along a crease. All panels passed this OT bend test which is the most rigorous examination of flexibility, without any cracking or peel-off along the crease.

The invention claimed is:
1. A self-priming, rapid curing, chromate free, corrosion resistant coating composition comprising:
  a) a linear vinyl terpolymer having three randomly distributed functional groups comprising acetyl, formal and hydroxyl groups along the vinyl backbone that offers cross-linking sites through the hydroxyl groups during curing;

b) an alkyd resin with a hydroxyl number from 80–200 measured as mg. potassium hydroxide per gram of the resin;
c) a mineral acid catalyst;
d) at least one organic solvent;
e) a drying agent; and, optionally,
f) at least one chromate free inorganic pigment and/or at least one organic dye.

2. The coating composition as claimed in claim 1, wherein the percentages by weight of polyvinyl alcohol, polyvinyl acetate and polyvinyl formal of the vinyl terpolymer are 6.0–15.0%, 9.0–15.0% and 70.0–84.0%, respectively.

3. The coating composition as claimed in claim 2, wherein the percentages by weight of polyvinyl alcohol, polyvinyl acetate and polyvinyl formal of the vinyl terpolymer are 6.0–7.5%, 10.0–13.0%, 80.0–83.0%, respectively.

4. The coating composition as claimed in claim 1, wherein the weight average molecular height of said vinyl terpolymer is 20,000 to 120,000.

5. The coating composition as claimed in claim 4, wherein the weight average molecular weight of said vinyl terpolymer is 25,000 to 70,000.

6. The coating composition as claimed in claim 1, wherein the hydroxyl number of the alkyd resin is from 120–140.

7. The coating composition as claimed in claim 1, wherein said alkyd resin is produced from linseed oil, glycerine, pentaerythritol, isophthalic acid and terephthalic acid with manganese nuxtra, cobalt naphthanate and zinc octoate driers in xylene solvent.

8. The coating composition as claimed in claim 1, wherein a solid percentage of the alkyd resin is from 60–75%.

9. The coating composition as claimed in claim 1, wherein the at least one organic solvent is selected from the group consisting of ethylene dichloride, xylene, toluene, naphtha, isopropanol, butanol, ethanol, methanol, methyl ethyl ketone (MEK), methyl isobutyl ketone (MIBK), cellosolve, cellosolve acetate and diacetone alcohol.

10. The coating composition as claimed in claim 2, wherein 7–25 parts of xylene, 3–15 parts of butanol and 25–55 parts of ethylene dichloride by weight are used as solvent.

11. The coating composition as claimed in claim 1, wherein the levels of total solids in the composition is 20–40% by weight.

12. The coating composition as claimed in claim 1, wherein said drying agent is selected from a group of metal octoate and/or naphthanates.

13. The coating composition as claimed in claim 12, wherein said drying agent is selected from a group consisting of zinc octoate, manganese nuxtra, and cobalt naphthanate and mixtures thereof.

14. The coating composition as claimed in claim 1, wherein said catalyst comprises 1–10% by weight of phosphoric acid based on the total weight of the vinyl terpolymer.

15. The coating composition as claimed in claim 1, which includes up to 15% of at least one chromate free inorganic pigment and/or at least one organic dye.

16. The coating composition as claimed in claim 1, further comprising at least one other corrosion inhibiting agent selected form the group consisting of zinc, other molybdates, zinc phosphate, mica, tolytriazole, complex organic titanates, and organic inhibitors which act by passive inhibition.

17. A coating composition as claimed in claim 1, further comprising said composition being a pigmented composition wherein titanium dioxide is included as an inorganic pigment.

18. The coating composition as claimed in claim 1, wherein the ingredients are present in the following weight percentages:

| Ingredients | Range of weight % |
| --- | --- |
| Polyvinyl Terpolymer | 10–22 |
| Alkyd Resin (100% solids basis) | 9–15 |
| Ortho Phosphoric Acid (88–93%) | 0.1–2.2 |
| Xylene | 7–25 |
| Butanol | 3–15 |
| Ethylene Dichloride | 25–55 |
| Manganese Nuxtra | 0–0.2 |
| Zinc Octoate | 0–0.2 |
| Cobalt Naphthanate | 0–0.2. |

19. The coating composition as claimed in claim 1, wherein the ingredients are present in the following weight percentages:

| Ingredients | Range of weight % |
| --- | --- |
| Polyvinyl Terpolymer | 10–20 |
| Alkyd Resin (100% solids basis) | 8–15 |
| Ortho Phosphoric Acid (88–93%) | 0.1–2.0 |
| Xylene | 7–25 |
| Butanol | 3–15 |
| Ethylene Dichloride | 25–55 |
| Titanium Dioxide | 5–15 |
| Manganese Nuxtra | 0–0.2 |
| Zinc Octoate | 0–0.2 |
| Cobalt Naphthanate | 0–0.2. |

20. The coating composition as claimed in claim 1, further comprising said composition being formulated as a free flowing one pack liquid.

21. A dry self-priming solvent-free rapid curing, chromate free corrosion resistant coating composition comprising:
a) a linear vinyl terpolymer having three randomly distributed functional groups comprising acetyl, formal and hydroxyl groups along the vinyl backbone that offers cross-linking sites through the hydroxyl groups during curing;
b) an alkyd resin with a hydroxyl number from 80–200 measured as mg. potassium hydroxide per gram of the resin;
c) a mineral acid catalyst;
d) a drying agent;
e) a plasticizer; and
f) a flow improver.

22. A method of forming a coating on a ferrous or non-ferrous metallic substrate which comprises:
a) degreasing a surface of said substrate on which a coating is to be formed;
b) preparing a coating composition as defined in claim 1 by dissolving a mixture of the vinyl terpolymer, alkyd resin, mineral acid catalyst and metallic drier and optionally incorporating at least one chromate free inorganic pigment and/or at least one organic dye and/or at least one other corrosion inhibitor in a blend of organic solvents;
c) applying said coating composition by a spray coating or a roller coating method in a continuous coil coating line to attain a desired thickness; and
d) curing said coating composition so applied to desired hardness at a temperature of from 180 to 280° C.

23. The method as claimed in claim 22, wherein said coating composition is prepared by dissolving 10–22 parts (by weight) of the polyvinyl terpolymer, 9–15 parts (by weight) of the alkyd resin (100% solids basis), mineral acid catalysts and metallic driers in 0–80 parts (by weight) of a blend of organic solvents selected from the group consisting of ethylene dichloride, xylene, toluene, naphtha, isopropanol, butanol, ethanol, methanol, methyl ethyl ketone (MEK), methyl isobutyl ketone (MIBK), cellosolve, cellosolve acetate and diacetone alcohol.

24. The method as claimed in claim 23, wherein 0.1–2.2 part (by weight) of orthophosphoric acid is used as catalyst, and 0–0.2 part (by weight) of manganese nuxtra, 0–0.2 part (by weight) of zinc octoate, and 0–0.2 part (by weight) of cobalt naphthanate are used as driers.

25. The method as claimed in claim 23, wherein a blend of 7–25 parts (by weight of xylene, 3–15 parts (by weight) of butanol and 25–55 parts (by weight) of ethylene dichloride are used as the organic solvents.

26. The method as claimed in claim 22, wherein 0–15 parts (by weight) of an organic pigment and/or organic dyes and other corrosion inhibiting agents other than chromates are added for preparing the said composition.

27. The method as claimed in claim 22, wherein 5–15 parts (by weight) of titanium dioxide is added as the inorganic pigment.

28. The method as claimed in claim 22, wherein said curing step is performed for a time less than 60 seconds.

29. The method as claimed in claim 28, wherein the said curing step is performed for a time less than 30 seconds.

30. The method as claimed in claim 22, wherein said coating is applied to a thickness of from 5–30 micrometers.

31. The method as claimed in claim 22, wherein said coating is applied to a thickness of from 10–25 micrometers.

32. The method as claimed in claim 22, wherein said applying step comprises applying said coating composition directly on the surface of the substrate as a top coat.

33. The method as claimed in claim 22, wherein said applying step comprises applying said coating composition directly on the surface of the substrate as an undercoat and wherein said applying step is followed by application of at least one top coat based on at least one resin selected from the group consisting of epoxy, urethane, alkyd, amino, and polyester.

34. An article comprising:
a) a ferrous or non-ferrous metallic substrate; and
b) a coating applied to at least one surface of the substrate by a method as claimed in claim 22.

35. The article as claimed in claim 34, wherein the substrate is selected from the group comprising of cold-rolled steel, hot dip galvanized steel, stainless steel, tin plated steel, aluminum and a non-ferrous substrate.

* * * * *